US009503336B2

(12) United States Patent
Zhou et al.

(10) Patent No.: US 9,503,336 B2
(45) Date of Patent: Nov. 22, 2016

(54) METHOD AND APPARATUS FOR OBTAINING CHANNEL STATE INFORMATION

(71) Applicant: HUAWEI TECHNOLOGIES CO., LTD., Shenzhen (CN)

(72) Inventors: Mingyu Zhou, Shenzhen (CN); Yongxing Zhou, Shenzhen (CN); Xiaotao Ren, Shenzhen (CN); Liang Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 14/158,048

(22) Filed: Jan. 17, 2014

(65) Prior Publication Data

US 2014/0133340 A1    May 15, 2014

Related U.S. Application Data

(63) Continuation of application No. PCT/CN2012/078971, filed on Jul. 20, 2012.

(30) Foreign Application Priority Data

Jul. 20, 2011 (CN) .......................... 2011 1 0203846
Sep. 15, 2011 (CN) .......................... 2011 1 0273699

(51) Int. Cl.
*H04L 12/26* (2006.01)
*H04L 5/00* (2006.01)
(Continued)

(52) U.S. Cl.
CPC ............. *H04L 43/08* (2013.01); *H04L 5/0035* (2013.01); *H04L 25/0204* (2013.01);
(Continued)

(58) Field of Classification Search
CPC ............... H04L 43/08; H04L 25/0228; H04L 25/0204; H04L 43/50; H04L 5/0035; H04W 24/00; H04W 48/00; H04W 28/06; H04B 7/0626
See application file for complete search history.

(56) References Cited

U.S. PATENT DOCUMENTS

2010/0322178 A1*  12/2010  Li ........................ H04L 5/0053
                                                                370/329
2012/0176996 A1*  7/2012  Kim .................. H04W 72/0413
                                                                370/329
(Continued)

FOREIGN PATENT DOCUMENTS

CN    101635950 A    1/2010
CN    101877608 A    11/2010
(Continued)

OTHER PUBLICATIONS

CATT, "Considerations on DL MIMO Feedback Mode," 3GPP TSG RAN WG1 meeting #59bis, Valencia, Spain, R1-100019, Jan. 2010, 4 pages.
(Continued)

*Primary Examiner* — Paul H Masur
*Assistant Examiner* — Kabir Jahangir
(74) *Attorney, Agent, or Firm* — Brinks Gilson & Lione

(57) ABSTRACT

This invention discloses method and apparatus for obtaining channel state information, and relates to the field of communication techniques, capable of reducing signaling and feedback overheads and lowering UE operation complexity. According to the solutions provided in embodiments of this invention, a RS predetermined transmission time and a RS predetermined frequency are transmitted to a UE by any one cell of at least two cells; each cell or cell group out of the at least two cells, according to the RS predetermined transmission time and the RS predetermined frequency, transmits a RS to the UE on different RS resources; the measurement result transmitted by the UE is received, which comprises CSI between any one cell or cell group out of at least two cells and the UE. The solutions provided in embodiments of this invention are applicable when it is required to obtain CSI between multiple cells and a UE.

18 Claims, 6 Drawing Sheets

(51) Int. Cl.
*H04L 25/02* (2006.01)
*H04W 24/00* (2009.01)
*H04W 48/00* (2009.01)
*H04B 7/06* (2006.01)
*H04W 28/06* (2009.01)

(52) U.S. Cl.
CPC .......... *H04L 25/0228* (2013.01); *H04L 43/50* (2013.01); *H04W 24/00* (2013.01); *H04W 48/00* (2013.01); *H04B 7/0626* (2013.01); *H04W 28/06* (2013.01)

(56) References Cited

U.S. PATENT DOCUMENTS

| | | | |
|---|---|---|---|
| 2012/0190356 A1 | 7/2012 | Zhao et al. | |
| 2012/0287875 A1* | 11/2012 | Kim | H04L 5/0048 370/329 |
| 2013/0033998 A1* | 2/2013 | Seo | H04W 24/00 370/252 |
| 2013/0094384 A1* | 4/2013 | Park | H04L 1/0026 370/252 |
| 2013/0301465 A1* | 11/2013 | Seo | H04B 7/0626 370/252 |
| 2014/0133336 A1* | 5/2014 | Park | H04W 24/10 370/252 |

FOREIGN PATENT DOCUMENTS

| | | |
|---|---|---|
| CN | 102036264 A | 4/2011 |
| CN | 102036292 A | 4/2011 |
| EP | 2291042 A1 | 3/2011 |
| WO | WO 2011/013990 A2 | 2/2011 |

OTHER PUBLICATIONS

Huawei, "Consideration on CSI-RS Design for CoMP and Text Proposal to 36.814," 3GPP TSG RAN WG1 meeting #58, Shenzhen, China, R1-093031, Aug. 2009, 8 pages.

Huawei, "Further Design and Evaluation on CSI-RS for CoMP," 3GPP TSG RAN WG1 meeting #58bis, Miyazaki, Japan, R1-093841, Oct. 2009, 9 pages.

Panasonic, "Flexible CoMP Operation Based on Dedicated CSI-RS Configuration," 3GPP TSG RAN WG1 meeting #65, Barcelona, Spain, R1-11587, May 2011, 5 pages.

* cited by examiner

METHOD AND APPARATUS FOR OBTAINING CHANNEL STATE INFORMATION

CROSS-REFERENCE TO RELATED APPLICATIONS

This application is a continuation of International Application No. PCT/CN2012/078971, filed on Jul. 20, 2012, which claims priority to Chinese Patent Application No. 201110203846.1, filed on Jul. 20, 2011 and Chinese Patent Application No. 201110273699.5, filed on Sep. 15, 2011, all of which are hereby incorporated by reference in their entireties.

TECHNICAL FIELD

This invention relates to the field of communication techniques, and more particularly, to a method and apparatus for obtaining channel state information.

BACKGROUND

In wireless communication systems, the application of CoMP (Coordinated Multiple Point transmission/reception) enables multiple cells to serve a single UE simultaneously, so as to improve the quality of signals received by UE (User Equipment), and thereby increase transmission efficiency. Herein, serving one UE by multiple cells simultaneously refers to any manner of improving the quality of signals received by the UE through coordination among multiple cells.

In a CoMP system, in order to achieve reasonable coordination among multiple cells serving one UE simultaneously, a cell responsible for scheduling needs to know CSI (Channel State Information) of wireless channels between the multiple cells and the UE. In the prior art, since signal configuration information is usually sent to the UE by a cell responsible for scheduling, each cell transmits its RS information to the cell responsible for scheduling, which then sends to the UE the RS (Reference Signal) information of each cell, including a RS sequence, RS transmission times and frequencies. According the received RS information, the UE may measure the RS transmitted from the multiple cells and feed back its measurement result to the cell responsible for scheduling. Hence, the cell responsible for scheduling may be aware of CSI of wireless channels between the multiple cells and the UE.

However, obtaining CSI of wireless channels between multiple channels and a UE with the technique in the prior art may bring about higher signaling and feedback overheads, as well as increased UE operation complexity.

SUMMARY

A method and apparatus for obtaining channel state information are provided in embodiments of this invention, capable of reducing signaling and feedback overheads and lowering UE operation complexity.

In order to achieve the above objects, the following technical solutions are employed in the embodiments of this invention:

A method for obtaining channel state information, comprising:

transmitting a RS predetermined time and a RS predetermined frequency to a UE from any one cell of at least two cells;

according to the RS predetermined transmission time and the RS predetermined frequency, transmitting a RS to the UE through different RS resources by each cell or cell group out of the at least two cells, to enable the UE to measure the RS received on the different RS resources sequentially according to the RS predetermined transmission time and the RS predetermined frequency;

receiving the measurement result transmitted by the UE, the measurement result comprising channel state information CSI between any one cell or cell group out of at least two cells and the UE.

A method for obtaining channel state information, comprising:

receiving a RS predetermined transmission time and a RS predetermined frequency transmitted by any one cell of at least two cells;

receiving a RS transmitted on different RS resources, and on the different RS resources, sequentially measuring the RS according to the RS predetermined time and the RS predetermined frequency, to obtain CSI between the at least two cells and the UE;

transmitting the measurement result to the any one cell of the at least two cells, the measurement result comprising CSI between any one cell or cell group out of at least two cells and the UE.

An apparatus for obtaining channel state information, a UE is served by at least two cells, the apparatus for obtaining channel state information is an apparatus in any one cell of the at least two cells, the apparatus comprising:

a transmission unit, for transmitting a RS predetermined time and a RS predetermined frequency to the UE;

a reference signal transmission unit, according to the RS predetermined transmission time and the RS predetermined frequency, for transmitting a RS to the UE on RS resources, to enable the UE to measure the RS received on the different RS resources sequentially according to the RS predetermined transmission time and the RS predetermined frequency, wherein the RS resources used by the at least two cells serving the UE when transmitting the RS to the UE according to the RS predetermined transmission time and the RS predetermined frequency are different RS resources;

a receiving unit, for receiving the measurement result transmitted by the UE, the measurement result comprising CSI between any one cell or cell group out of at least two cells and the UE.

An apparatus for obtaining channel state information, characterized in comprising:

a first receiving unit, for receiving a RS predetermined time and a RS predetermined frequency transmitted by any one cell of at least two cells;

a reference signal receiving unit, for receiving a RS transmitted on different RS resources, and on the different RS resources, sequentially measuring the RS according to the RS predetermined time and the RS predetermined frequency, to obtain CSI between the at least two cells and the UE;

a transmission unit, for transmitting the measurement result to any one cell of the at least two cells, the measurement result comprising CSI between any one cell or cell group out of at least two cells and the UE.

According to the method and apparatus for obtaining channel state information provided in the embodiment of this invention, a RS predetermined transmission time and a RS predetermined frequency are transmitted to a UE by any one cell of at least two cells; each cell or cell group out of the at least two cells, according to the RS predetermined transmission time and the RS predetermined frequency, transmits a RS to the UE on different RS resources, to enable the UE to measure the RS received on the different RS resources sequentially according to the RS predetermined transmission time and the RS predetermined frequency; the measurement result transmitted by the UE is received, which comprises CSI between any one cell or cell group out of at least two cells and the UE. As compared to the larger signaling and feedback overheads and increased UE operation complexity in the acquisition of CSI between multiple cells and the UE in the prior art, through transmitting information of one RS to the UE, the solution provided in the embodiment of this invention enables the UE to measure only one RS and feed back CSI corresponding to the RS, so that signaling and feedback overheads may be reduced, and UE operation complexity may be lowered.

BRIEF DESCRIPTION OF DRAWING(S)

For a more explicit description of the technical solutions of embodiments of this invention, a brief introduction of accompanying drawings to be used in the description of these embodiments will be given below. Obviously, accompanying drawings described below are merely some embodiments of this invention, for those skilled in the art, other accompanying drawings can be derived from these ones without any creative efforts.

DESCRIPTION OF EMBODIMENTS

A clear and complete description of technical solutions of embodiments of this invention will be given with reference to the accompanying drawings of the embodiments of this invention. Obviously, embodiments described herein are merely some embodiments of this invention, but not all of them. Based on these embodiments of this invention, other embodiments can occur to those skilled in the art without any creative efforts, all of which fall within the scope of this invention.

Note that, in the solutions provided in embodiments of this invention, a UE is served by at least two cells, each of which corresponds to a BS (base station) or a transceiver node for receiving or transmitting signals.

In the solutions provided in embodiments of this invention, RS resources takes TTI (Transmission Time Interval) as a unit in time and PRB (Physical Resource Block) as a unit in frequency. One TTI has a length of 1 ms, comprising 14 symbols; the unit in frequency is PRB, and one PRB comprises 12 subcarriers within a TTI, wherein each subcarrier on each symbol is called as a RE (Resource Element), that is, a PRB comprises (12×14) REs. Each RE corresponds to a time in the unit of symbols and a frequency in the unit of subcarriers, also called as a time-frequency grid point, the formation of RS predetermined transmission time and RS predetermined frequency is (K,L), i.e., the RS is located on the Kth subcarrier and the Lth symbol within a PRB, and which is the format of the signal. Particularly, a RE transmission time, a RE number, and a RE position are transmitted to the UE. The RE position may be represented as (K,L), for example, K is 0, 1, . . . , 11; L is 0, 1, . . . , 13.

Embodiment 1

Figure 1:
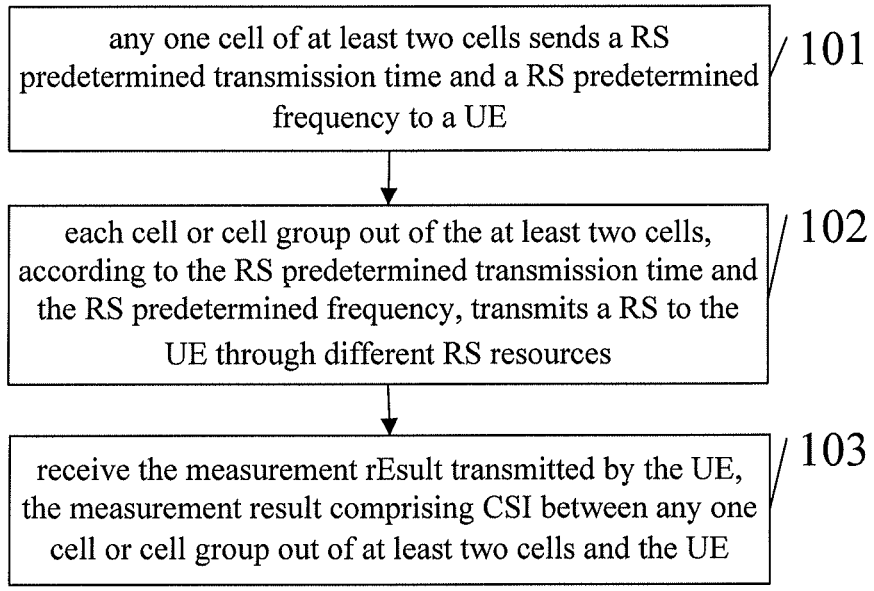
FIG. 1 is a flowchart of a method for obtaining channel state information provided in embodiment 1 of this invention.

A method for obtaining channel state information is provided in an embodiment of this invention, as shown in FIG. 1, the method comprises:

Step 101, any one cell of at least two cells sends a RS predetermined transmission time and a RS predetermined frequency to a UE;

Step 102, each cell or cell group out of the at least two cells, according to the RS predetermined transmission time and the RS predetermined frequency, transmits a RS to the UE through different RS resources to enable the UE to measure the RS received on the different RS resources sequentially according to the RS predetermined transmission time and the RS predetermined frequency;

Further, before step 102, it is necessary to obtain identical RS sequence information and send it to the UE, wherein the RS sequence information is used to generate the RS; wherein the identical RS sequence information can be obtained in the following ways: obtaining the identical RS sequence information from a serving cell of the UE, wherein a cell sending signaling to the UE through a PDCCH (Physical Downlink Control Channel) is the serving cell; or obtaining the identical RS sequence information through an interface between the at least two cells; or determining the identical RS sequence information by the at least two cells respectively.

Further, a filtering coefficient is set to 0, and the filtering coefficient and a filtering cycle is transmitted to the UE, to enable the UE to perform filtering on the CSI between any one cell or cell group out of at least two cells and the UE obtained by the UE through measuring the RS.

Step 103, the measurement result transmitted by the UE is received, the measurement result comprising CSI between any one cell or cell group out of at least two cells, and the UE.

The CSI is CSI obtained after filtering.

The execution body of the method is any one cell of the at least two cells, particularly, a base station or a transceiver node in the cell.

Figure 2:
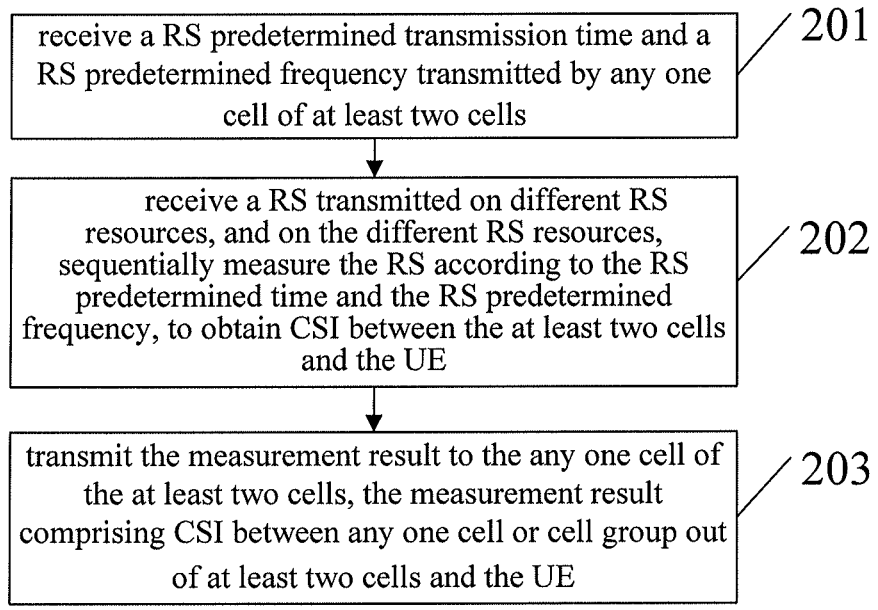
FIG. 2 is a flowchart of another method for obtaining channel state information provided in embodiment 1 of this invention.

Another method for obtaining channel state information is provided in the embodiment of this invention, as shown in FIG. 2, the method comprises:

Step 201, receive a RS predetermined transmission time and a RS predetermined frequency transmitted by any one cell of at least two cells;

Step 202, receive a RS transmitted on different RS resources, and on the different RS resources, measure the RS according to the RS predetermined time and the RS predetermined frequency, to obtain CSI between the at least two cells and the UE;

Further, before receiving the RS transmitted on different RS resources by any one cell or cell group out of at least two cells, identical RS sequence information transmitted from the any one cell of the at least two cells is received, wherein the identical RS sequence information is used to generate the RS;

Further, after receiving the RS transmitted on different RS resources by any one cell or cell group out of at least two cells, a filtering coefficient and a filtering cycle transmitted from the any one cell of the at least two cells are received, and filtering is performed on the CSI between the any one cell or cell group out of at least two cells and the UE obtained through measuring the RS.

Step 203, transmit the measurement result to the any one cell of the at least two cells, the measurement result comprising CSI between any one cell or cell group out of at least two cells and the UE.

The execution body of this method is the UE.

According to the method for obtaining channel state information provided in the embodiment of this invention, a RS predetermined transmission time and a RS predetermined frequency are transmitted to a UE by any one cell of at least two cells; each cell or cell group out of the at least two cells, according to the RS predetermined transmission time and the RS predetermined frequency, transmits a RS to the UE on different RS resources, to enable the UE to sequentially measure the RS transmitted by each cell or cell group out of the at least two cells on the different RS resources according to the RS predetermined transmission time and the RS predetermined frequency; the measurement result transmitted by the UE is received, which comprises CSI between any one cell or cell group out of at least two cells and the UE. As compared to the larger signaling and feedback overheads and increased UE operation complexity in the acquisition of CSI between multiple cells and the UE in the prior art, through transmitting information of one RS to the UE, the solution provided in the embodiment of this invention enables the UE to measure only one RS and feed back CSI corresponding to the RS, so that signaling and feedback overheads may be reduced, and UE operation complexity may be lowered.

Figure 3:
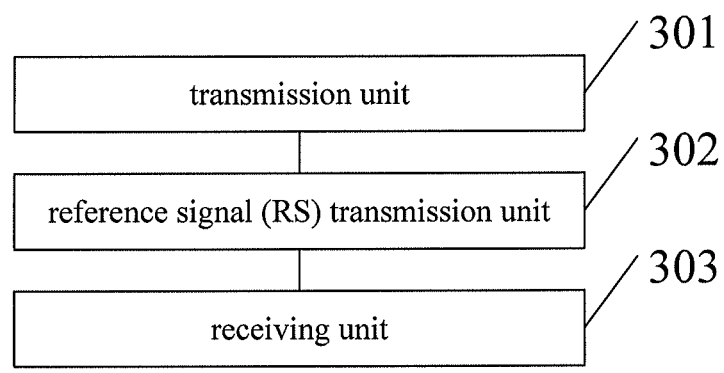
FIG. 3 is a block diagram of an apparatus for obtaining channel state information provided in embodiment 1 of this invention.

An apparatus for obtaining channel state information is provided in an embodiment of this invention, wherein the apparatus is used to implement the method of FIG. 1, and is in any one cell of at least two cells serving a UE, particularly, it may be a BS or a transceiver node in the cell. As shown in FIG. 3, the apparatus comprises: a transmission unit 301, a reference signal (RS) transmission unit 302, and a receiving unit 303.

The transmission unit 301 is used to transmit a RS predetermined time and a RS predetermined frequency to the UE;

Further, an execution unit is used to obtain identical RS sequence information and send it to the UE, wherein the RS sequence information is used to generate the RS; particularly, when obtaining the identical RS sequence information, it can be obtained from a serving cell of the UE, wherein a cell sending signaling to the UE through a PDCCH (Physical Downlink Control Channel) is the serving cell; or it can be obtained through an interface between the at least two cells; or it can be determined by the at least two cells respectively.

The reference signal (RS) transmission unit 302 is used to, according to the RS predetermined transmission time and the RS predetermined frequency, transmit a RS to the UE through RS resources, to enable the UE to sequentially measure the RS transmitted by each cell or cell group out of the at least two cells on the different RS resources according to the RS predetermined transmission time and the RS predetermined frequency; wherein RS resources used by the at least two cells serving the UE when transmitting the RS to the UE according to the RS predetermined transmission time and the RS predetermined frequency are different RS resources;

Further, when each cell of the at least two cells transmits the RS on different RS resources, the reference signal transmission unit is further used to: on the RS resource on which a first cell transmits the RS to the UE according to the RS predetermined transmission time and the RS predetermined frequency, do not transmit RS to the UE according to the RS predetermined transmission time and the RS predetermined frequency, wherein the apparatus the reference signal transmission unit is located in belongs to a cell different to the first cell, and the first cell is any one cell of the at least two cells;

The reference signal transmission unit is further used to: on the RS resource on which the first cell transmits the RS to the UE according to the RS predetermined transmission time and the RS predetermined frequency, transmit no signal at the RS predetermined transmission time and the RS predetermined frequency;

Further, a computing unit is used to compute the index of the RS predetermined transmission time and the RS predetermined frequency according to the total number of all RS predetermined transmission times and RS predetermined frequencies, a RS resource number, a cell ID, the total number of cells transmitting the RS to the UE, and some or all references of a random sequence;

Further, a setting unit is used to set a filtering coefficient to zero; a filtering signal transmission unit is used to send the filtering coefficient and a filtering cycle to the UE, to enable the UE to perform filtering on the CSI between any one cell or cell group out of at least two cells and the UE obtained by the UE through measuring the RS;

the receiving unit 303 is used to receive the measurement result transmitted by the UE, the measurement result comprising CSI between any one cell or cell group out of at least two cells and the UE.

Figure 4:
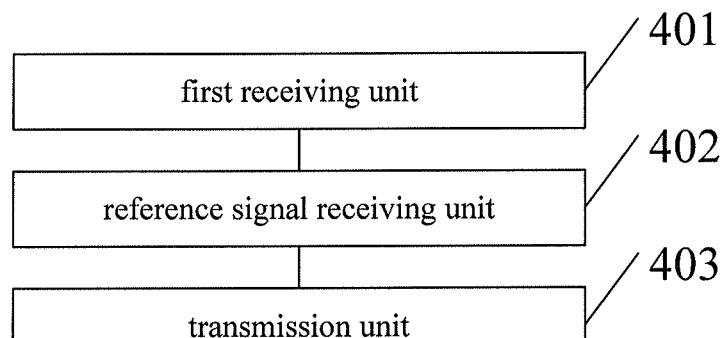
FIG. 4 is a block diagram of another apparatus for obtaining channel state information provided in embodiment 1 of this invention.

An apparatus for obtaining channel state information is provided in an embodiment of this invention, which is used to implement the method of FIG. 2, and which may be a UE. As shown in FIG. 4, the apparatus comprises: a first receiving unit 401, a reference signal receiving unit 402, and a transmission unit 403.

The first receiving unit 401 is used to receive a RS predetermined time and a RS predetermined frequency transmitted by any one cell of at least two cells;

Further, a second receiving unit is used to receive identical RS sequence information transmitted from the any one cell of the at least two cells, wherein the identical RS sequence information is used to generate the RS.

The reference signal receiving unit 402 is used to receive a RS transmitted on different RS resources, and on the different RS resources, sequentially measure the RS according to the RS predetermined time and the RS predetermined frequency, to obtain CSI between the at least two cells and the UE;

Further, after receiving the RS, a filtering signal receiving unit receives a filtering coefficient and a filtering cycle transmitted from the any one cell of the at least two cells, and performs filtering on the CSI between the any one cell or cell group out of at least two cells and the UE obtained through measuring the RS, wherein the filtering coefficient is zero.

The transmission unit 403 is used to transmit the measurement result to any one cell of the at least two cells, the measurement result comprising CSI between any one cell or cell group out of at least two cells and the UE.

According to the apparatus for obtaining channel state information provided in the embodiment of this invention, a RS predetermined transmission time and a RS predetermined frequency are transmitted to a UE by the transmission unit; the reference signal transmission unit, according to the RS predetermined transmission time and the RS predetermined frequency, transmits a RS to the UE through different RS resources; the receiving unit receives the measurement result transmitted by the UE, which comprises CSI between any one cell or cell group out of at least two cells and the UE. As compared to the larger signaling and feedback overheads and increased UE operation complexity in the acquisition of CSI between multiple cells and the UE in the prior art, through transmitting information of one RS to the UE, the solution provided in the embodiment of this invention enables the UE to measure only one RS and feed back CSI corresponding to the RS, so that signaling and feedback overheads may be reduced, and UE operation complexity may be lowered.

Embodiment 2

Figure 5:
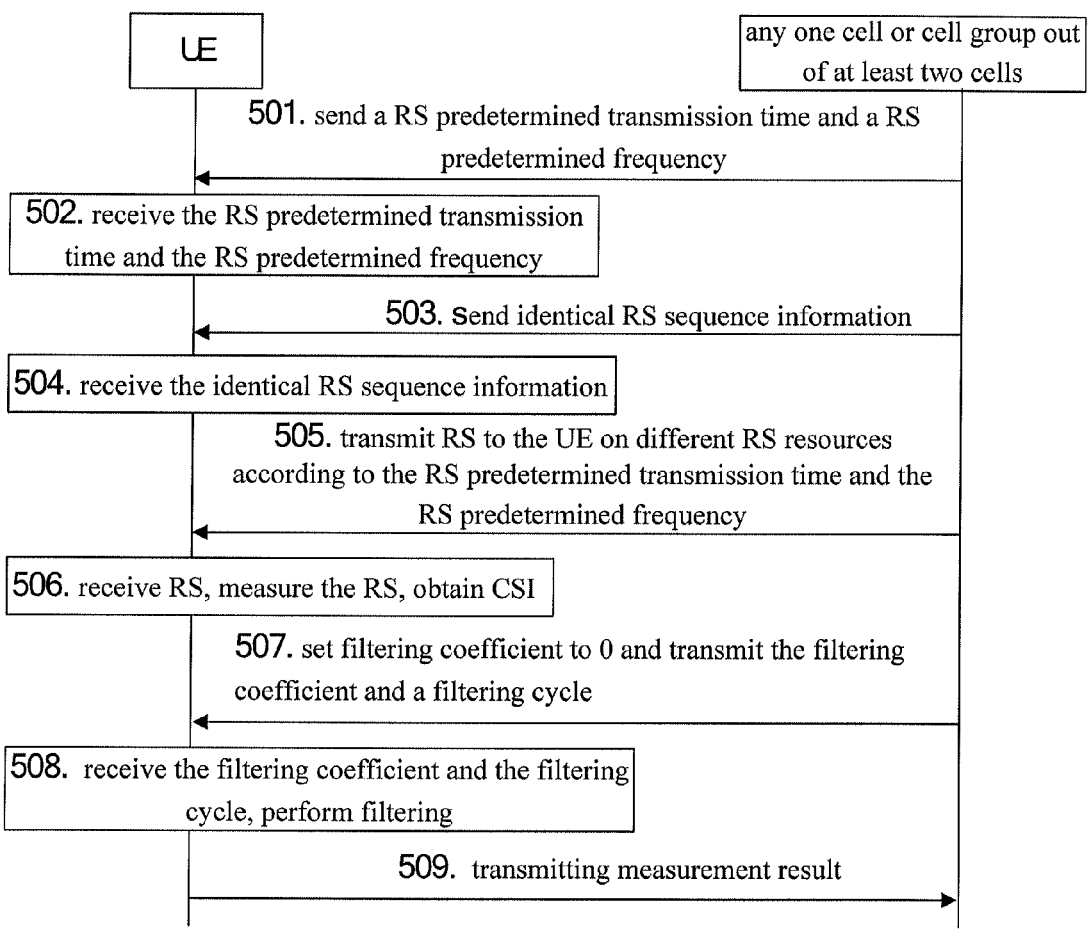
FIG. 5 is a flowchart of a method for obtaining channel state information provided in embodiment 2 of this invention.
Figure 6:
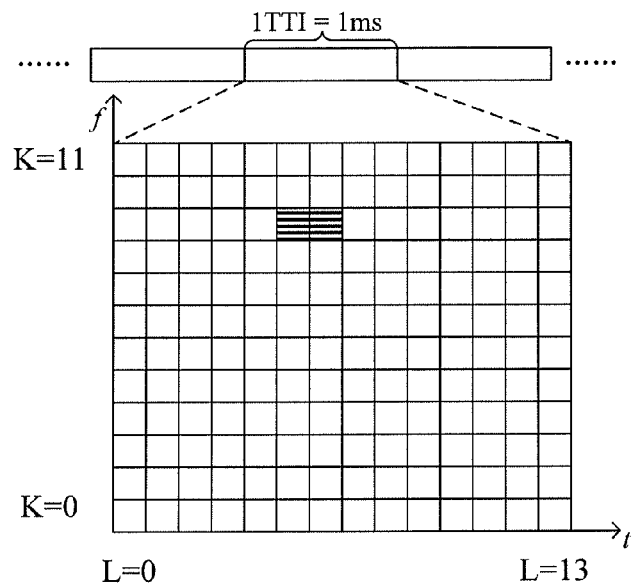
FIG. 6 is a schematic diagram of a pattern of RS predetermined transmission time and RS predetermined transmission frequency provided in embodiment 2 of this invention.

A method for obtaining channel state information is provided in an embodiment of this invention, as shown in FIG. 5, the method comprises:

Step 501, any one cell of at least two cells sends a RS predetermined transmission time and a RS predetermined frequency to a UE;

Time-frequency may be also called as a grid of time-frequency. RS resources may take TTI (Transmission Time Interval) as a unit in time and PRB (Physical Resource Block) as a unit in frequency, as shown in FIG. 6, a pattern of RS predetermined time and RS predetermined frequency, that is, a signal format, resources for RS transmission takes TTI as a unit in time; one TTI has a length of 1 ms; one TTI comprises 14 symbols, as shown by the horizontal axis L of FIG. 6, the vertical axis K represents PRB, each PRB representing 12 subcarriers within a TTI, wherein each subcarrier on a symbol is called as a RE (Resource Element), that is, a PRB comprises (12*14) REs. Particularly, a RE transmission time, a RE number, and a RE position are sent to the UE. The RE position may be represented as (K,L), for example, K is 0, 1, . . . , 11; L is 0, 1, . . . , 13.

Note that information of a set of available RS resources has to be sent to the UE, comprising RS transmission time configuration, RS transmission cycle, RS offset, as shown in the following table:

| RS transmission time configuration $I_{CSI-RS}$ | RS cycle (TTI) | RS offset (TTI) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

For example, when RS transmission time configuration $I_{CSI-RS}$ is 36, which corresponds to the row of 35-74, it can be found that the RS cycle has 40 TTIs, RS offset is 1 TTI, representing that the RS is sent at the TTIs numbered 1, 41, 81, 121 . . . . In the solution provided in the embodiment of this invention, RS transmission time configuration $I_{CSI-RS}$ is 0, indicating a RS cycle of 5TTIs and a RS offset of 0, that is, the RS is sent at the TTIs numbered 0, 5, 10, 15, . . . , with all PRBs being used in the RS transmission.

Note that any one cell or cell group out of at least two cells, may send a RS predetermined transmission time and a RS predetermined frequency to the UE; the cell group may be multiple cells, and may comprise any number N (N>1) cells of the at least two cells.

Step 502: the UE receives the RS predetermined transmission time and the RS predetermined frequency sent from any one of the at least two cells;

Step 503: any one of the at least two cells obtains identical RS sequence information and send it to the UE, wherein the RS sequence information is used to generate the RS;

Particularly, the RS sent by each of the at least two cells is generated from a sequence, for example, in a LTE-Advanced system, the generation function of the CSI-RS sequence is:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

Wherein, c(•) represents a random sequence, with characteristics dependent on the cell Identity (ID) and the TTI index; m represents a PRB number, $N_{RB}^{max,DL}$ represents the maximum number of DL (Downlink) PRBs. Upon generating a sequence of r(m) in a length $N_{RB}^{max,DL}$ according to the above equation, the cell maps the sequence to REs used for CSI-RS transmission and sends them to the UE along with other signals.

Thereby, before generating CSI-RS, the cell has to acquire the cell ID and TTI number, both belonging to RS sequence related information. In this invention, the RS sequences sent by various cells according to the RS predetermined transmission time and the RS predetermined frequency have the same characteristics, causing that every cell uses the same cell ID and TTI number to generate CSI-RS, and thus the UE only needs to measure a sequence generated according to one set of RS sequence related information.

Note that the term "identical" as mentioned in "the identical RS sequence information" means, when sending RS to the UE, the transition time and transmission frequency are identical to the RS predetermined transmission time and the RS predetermined frequency.

Further, any one of the at least two cells acquires the identical RS sequence information according to any one of the following ways:

Way 1: acquire the identical RS sequence information from a serving cell of the UE;

In a CoMP (Coordinated Multiple Point transmission/reception) system, a cell sending signaling to the UE through a PDCCH (Physical Downlink Control Channel) is called as the serving cell of the UE, which is generally a cell to which the UE is accessed and has the best channel communication state; other cells transmitting data to the UE are called as coordinated cells; the serving cell and the coordinated cells constitute a coordinated collection.

For a UE served by only one cell, the cell is the serving cell of the UE, and the RS sequence related information is determined by this cell, for example, the cell ID used in CSI-RS generation is the ID of that cell;

For a UE served by multiple cells, the RS sequence related information is determined by a serving cell, facilitating the switch of the UE from the state of served by multiple cells to a state of served by only one cell, and thus it can be determined that the cell ID used in the process of generating the CSI-RS sequence is the ID of the serving cell.

Way 2: acquire the identical RS sequence information through an interface between the at least two cells;

For example, cell 1 is a serving cell of the UE, thus the RS sequence related information is determined by cell 1, and is transmitted to cell 2 through an interface between the cells, facilitating cell 2 to use the same RS sequence related information as cell 1. For example, cell 1 transmits the ID of cell 1 to cell 2 through an interface therebetween, so that cell 2 can generate a CSI-RS with the same characteristics as the CSI-RS generated by cell 1, according to that ID. Further, the TTI number is commonly consistent for different cells, and thus is not required to be transmitted through the interface between the cells.

Generally, each cell is controlled by a BS, and a BS generally controls multiple cells. Specifically, when cell 1 and cell 2 are controlled by different BSs, it is necessary to transmit RS sequence related information through an interface between the BSs. Herein, the interface between the BSs is one type of interface between cells. For example, in a LTE-Advanced system, the interface between the BSs is referred to as a X2 interface, Cell 1 is controlled by BS 1, Cell 2 is controlled by BS 2; BS 1 transmits the ID of cell 1 to BS 2 through the interface between the BSs, enabling cell 2 to generate a CSI-RS with the same characteristics as that generated by cell 1.

Herein, cell 1 is the serving cell merely as an example. Cell 1 may not be the serving cell, which is a difference to Way 1.

Way 3: the at least two cells determine the identical RS sequence information respectively.

When it is difficult to adjust the RS sequence related information used by each of the at least two cells to be consistent, it is not easy to transmit the RS sequence related information through an interface between the cells, hence each cell may determine its RS sequence information individually. For example, for an interface between BSs (one kind of interface between cells) with small capacity, it is not commonly desired to transmit RS sequence related information through such an interface, and it is difficult to adjust the RS sequence related information used by each cell to be consistent. Thereby, in such scenarios, cell 1 and cell 2 determine their RS sequence related information respectively, and generate RS according to their respective RS sequence related information.

Step 504: the US receives the identical RS sequence information transmitted from any one of the at least two cells, the RS sequence information being used to generate the RS;

Note that the RS sequence information is used to measure a received RS at the UE. In this way, using a RS sequence corresponding to the RS sequence information, any of the at least two cells generates a RS, which passes through a wireless channel during the transmission to the UE; after received by the UE, it performs convolution or the like on the received signal that has passed through the wireless channel by using the RS sequence corresponding to the identical RS sequence information, to obtain CSI of the wireless channel.

Step 505: each or cell group out of at least two cells, according to the RS predetermined transmission time and the RS predetermined frequency, sends the RS to the UE through a different RS resource, so that, according to the RS predetermined transmission time and the RS predetermined frequency, the UE measures the RS received on different RS resources successively;

Note that, in the above step, one cell or multiple cells, i.e. cell group, may send the RS to the UE on RS resources. Below, a description will be given according to two manners of transmitting the RS by each of the at least two cells, and transmitting the RS by a cell group.

The First Manner:

Further, each of the at least two cells transmits the RS to the UE. As shown in FIG. 6, at a PRB, the cell transmits the RS on the illustrated positions, i.e., the RS is transmitted on RE (9,5) and RE(9,6), and thus these two REs of the PRB are the RS predetermined transmission time and the RS predetermined frequency of the PRB, which are also called as a RS pattern. Wherein, the number of REs contained in a RS pattern is generally related to the number of antenna ports used to transmit the RS, for example, the RS pattern of FIG. 6 contains two REs, corresponding to the scenario of transmitting the RS through one or two antenna ports. Two antenna ports may multiplex the two REs in a code division manner.

Note that, on the same RS resource, transmitting the RS by each cell may comprise: a first cell transmits the RS to the UE according to the RS predetermined transmission time and the RS predetermined frequency; other cells except the first cell of the at least two cells do not transmit the RS to the UE according to the RS predetermined transmission time and the RS predetermined frequency, wherein the first cell is any one of the at least two cells;

For example, when the UE is served by two cells, on a first resource, cell 1 transmit the RS to the UE according to the RS predetermined transmission time and the RS predetermined frequency, and cell 2 does not transmit the RS to the UE according to the RS predetermined transmission time and the RS predetermined frequency; on a second resource, cell 2 transmit the RS to the UE according to the RS predetermined transmission time and the RS predetermined frequency, and cell 1 does not transmit the RS to the UE according to the RS predetermined transmission time and the RS predetermined frequency.

Note that, if "cell 2 does not transmit the RS to the UE according to the RS predetermined transmission time and the RS predetermined frequency" is implemented as "does not transmit the RS at all", interference produced on the RS transmitted by cell 1 can be reduced, which is helpful to measure the RS of cell 1 by the UE; while the RS predetermined transmission time and the RS predetermined frequency on the first resource of cell 2 cannot be used by other UEs of cell 2 to measure CSI. When there are a larger number of UEs, it may cause a problem of insufficient CSI-RS capacity. Therefore, cell 2 may transmit its RS according to another RS pattern, facilitating other UEs except the said one to measure CSI.

Particularly, there are two ways of not transmitting the RS to the UE according to the RS predetermined transmission time and the RS predetermined frequency by cell 2:

Way 1: according to a RS pattern different from the RS pattern, transmit the RS to the UE. Herein, the RS pattern particularly refers to the RS predetermined transmission time and the RS predetermined frequency.

Particularly, cell 1 and cell 2 transmit the RS at different RS predetermined transmission times and different RS predetermined frequencies (RS patterns). For example, on TTIs 0, 10, 20, . . . (first resource), as to the same PRB, the pattern of the RS transmitted by cell 1 comprises two REs (9,5) and (9,6), and the pattern of the RS transmitted by cell 2 comprises two REs (3,5) and (3,6). On TTI 5, 15, 25, . . . (second resource), as to the same PRB, the pattern of the RS transmitted by cell 1 comprises two REs (4,5) and (4,6), and the pattern of the RS transmitted by cell 2 comprises two REs (9,5) and (9,6). That is, the pattern used by cell 1 to transmit the RS hops between the first resource and the second resource. Thus, other UE may detects the RS transmitted by cell2 at the two REs (3,5) and (3,6) on the first resource, and may detects the RS transmitted by cell1 at the two REs (4,5) and (4,6) on the second resource too.

Way 2: cells except for the first cell of the at least two cells do not transmit the signal at the RS predetermined transmission time and the RS predetermined frequency.

Particularly, assume that the UE is served by two cells, on the first resource, cell 1 transmits the RS to the UE according to the RS predetermined transmission time and the RS predetermined frequency, and cell 2 does not transmit the signal at the RS predetermined transmission time and the RS predetermined frequency; on the second resource, cell 2 transmits the RS to the UE according to the RS predetermined transmission time and the RS predetermined frequency, and cell 1 does not transmit the signal at the RS predetermined transmission time and the RS predetermined frequency.

Cell 2 does not transmit the signal on the RS transmission pattern of cell 1, so that cell 2 does not interfere with the signal transmitted by cell 1, which is beneficial to the UE to measure the RS transmitted by cell 1. Similarly, cell 1 does not transmit the signal on the RS transmission pattern of cell 2, so that cell 1 does not interfere with the signal transmitted by cell 2, which is beneficial to the UE to measure the RS transmitted by cell 2.

Figure 7:
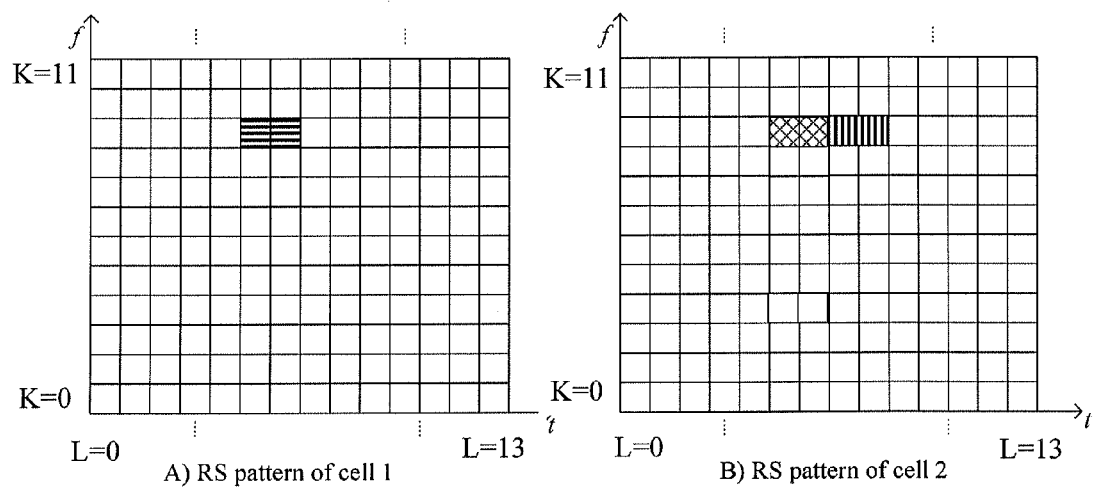
FIG. 7 is a schematic diagram of transmitting a RS by different cells on a first resource provided in embodiment 2 of this invention.

For example, on TTIs 0, 10, 20, . . . (first resource), the patterns of the RS transmitted by cell 1 and cell 2 are shown in FIG. 7, for the same PRB, as shown in FIG. 7A, the pattern of the RS transmitted by cell 1 comprises two REs (9,5) and (9,6), as shown in FIG. 7B, the pattern of the RS transmitted by cell 2 comprises two REs (9,7) and (9,8), and cell 2 does not transmit the signal on the corresponding patterns where cell 1 transmits the RS, that is, cell 2 does not transmit the signal at the two REs (9,5) and (9,6), as shown in FIG. 7B.

Figure 8:
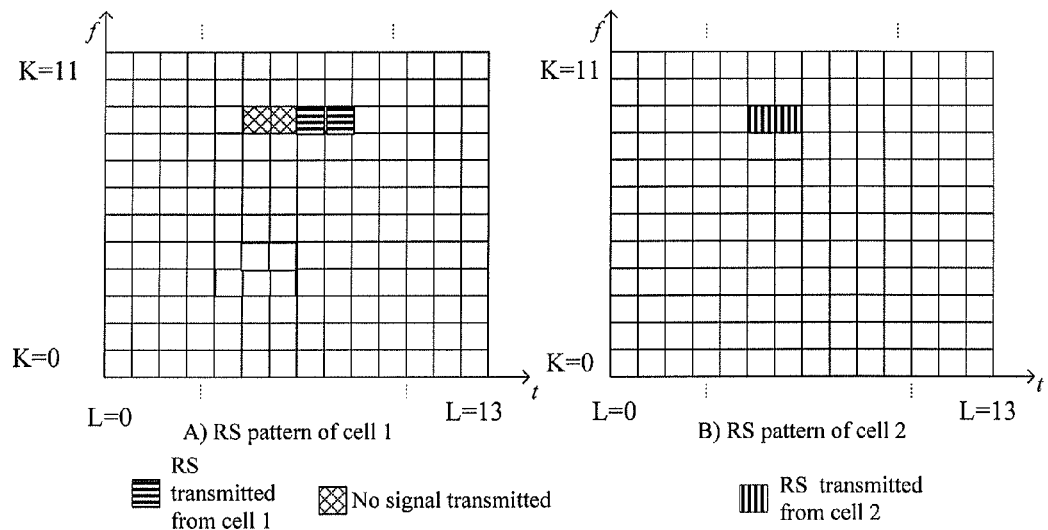
FIG. 8 is a schematic diagram of transmitting a RS by different cells on a second resource provided in embodiment 2 of this invention.

Similarly, on TTIs 5, 15, 25, . . . (second resource), the patterns of the RS transmitted by cell 1 and cell 2 are shown in FIG. 8, for the same PRB, as shown in FIG. 8A, the pattern of the RS transmitted by cell 1 comprises two REs (9,7) and (9,8), as shown in FIG. 8B, the pattern of the RS transmitted by cell 2 comprises two REs (9,5) and (9,6), and cell 1 does not transmit the signal on the pattern corresponding to the RS transmission of cell 2, that is, cell 1 does not transmit the signal at the two REs (9,5) and (9,6), as shown in FIG. 8B.

Figure 9:
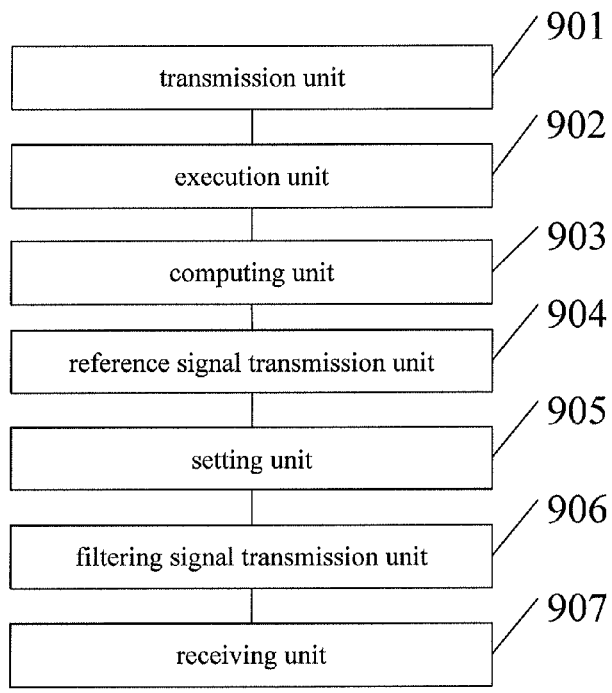
FIG. 9 is a block diagram of an apparatus for obtaining channel state information provided in embodiment 2 of this invention.

Further, because it is common for a cell to keep constant transmission power with time, in such case, power redistribution is necessary. As shown in FIG. 9, cell 1 transmits the RS on TTI 0 at the 5th and 6th symbols (L=5, 6), while transmits the RS on TTI 5 at the 7th and 8th symbols (L=7, 8), when cell 1 transmits the RS on TTI 5, because REs (9,5) and (9,6) on the 5th and 6th symbols are not required to transmit the signal, the cell may increase the power of other signals on the $5^{th}$ and 6th symbols except for the REs (9,5) and (9,6), and distribute the power for otherwise transmitting the RS on TTI 0 to other signals except for the RS.

Or, because when cell 2 transmits the RS on TTI 0, the signal is not transmitted at the two REs (9,5) and (9,6), other REs except for these two REs have higher signal power. While when cell 2 transmits the RS on TTI 5, these two REs are required to transmit the signal, so that it is necessary to reduce the power of other signals except for the RS at the 5th and 6th symbols (L=5,6), to ensure that the transmission power of these symbols when the RS is transmitted on TTI 5 is equal to the transmission power of the symbols when the RS is transmitted on TTI 0.

The Second Manner:

Further, a cell group transmit the RS to the UE through different RS resources; for example, on TTIs 0, 10, 20, . . . (first resource), the pattern of the RS transmitted by cell 1 comprises two REs (9,5) and (9,6), cell 2 does not transmit the RS at these two REs; on TTIs 5, 15, 25, . . . (second resource), cell 1 and cell 2 cooperate to transmit the RS on two REs with the patterns (9,5) and (9,6), herein, the cell group represents cell 1 and cell 2;

Wherein, the number of REs contained in a RS pattern is generally related to the number of antenna ports for transmitting the RS, when cell group transmits the RS to the UE, the total number of antenna ports used is identical to the port number when transmitting the RS to the UE by a single cell. For example, cell 1 transmits the RS to the UE using 4 antenna ports; when cell 1 and cell 2 cooperate to transmit the RS to the UE, the total number of antenna ports used by cell 1 and cell 2 is also 4; cell 1 transmits the RS with antenna port 0 and antenna port 1, cell 2 transmits the RS with antenna port 2 and antenna port 3, so that it is not necessary to send additional signaling to the UE to notify variation of antenna ports.

Further, the index of a RS pattern used by each cell to transmit the RS to the UE is calculated depending on some or all references of the total number of all RS patterns, resource index, cell ID, the total number of cells to transmit the RS to the UE according to the RS pattern, a random sequence. Particularly, the pattern used by the cell to transmit the RS depends on the total number of all RS patterns, which is helpful to limit the RS pattern index into an appropriate range;

The pattern used by the cell to transmit the RS depends on a resource number, so that it can be realized for a cell to transmit the RS according to different RS patterns on different resources;

The pattern used by the cell to transmit the RS depends on a cell ID, so that it can be realized for different cells to transmit the RS using different RS patterns on the same resource;

The pattern used by the cell to transmit the RS depends on the total number of cells to transmit the RS to the UE according to the RS pattern, which is helpful to limit the RS pattern index to some of all RS patterns, facilitating the UE to only measure the RS transmitted from several particular cells;

The pattern used by the cell to transmit the RS depends on a random sequence, which is helpful to randomize interference on the RS received by the UE, because adjacent cells and this cell suffer different interference when transmitting the RS using different time-frequency grid points. If adjacent cells and this cell use the same time-frequency grid point, the interference tends to become larger, if time-frequency grid points used to transmit the RS are controlled by a random sequence, different RS time-frequency grid points are used at different times to transmit the RS, so that interference in the RS transmission of this cell will be randomized.

Generally, RS patterns (RS predetermined transmission time and RS predetermined frequency) used by various cells to transmit the RS to the UE may be numbered, as shown in the table below, a table of all RS pattern indexes corresponding to transmitting the RS through A antenna ports, wherein there are M RS patterns, and $(K_{i,j}, L_{i,j})$ represents the RE corresponding to the jth antenna port of RS pattern index i.

| RS pattern index | RE corresponding to RS pattern |
|---|---|
| 0 | $\{(K_{0, 0}, L_{0, 0}), (K_{0, 1}, L_{0, 1}), \ldots, (K_{0, A}, L_{0, A})\}$ |
| 1 | $\{(K_{1, 0}, L_{1, 0}), (K_{1, 1}, L_{1, 1}), \ldots, (K_{1, A}, L_{1, A})\}$ |
| ... | ... |
| M | $\{(K_{M, 0}, L_{M, 0}), (K_{M, 1}, L_{M, 1}), \ldots, (K_{M, A}, L_{M, A})\}$ |

Particularly, RS patterns used by various cells to transmit the RS to the UE may be numbered in the following ways:

Way 1: Pattern_ID=(Cell_ID+N_TTI)mod M; wherein, Pattern_ID represents the ID of the RS predetermined transmission time and the RS predetermined frequency used for transmitting the RS, Cell_ID represents the ID of the cell transmitting the RS, N_TTI represents the number of the TTI on which the RS is transmitted, or the cycle of transmitting the RS, mod represents modulus operation, the value of M is preset on both the cell side and the UE side;

For example, the ID of any cell is 1, M is 20, on TTI 1 (N_TTI=1), Pattern_ID=(1+1) mod 20=2 as calculated, and thus on TTI 1, any cell transmits the RS according to RS pattern index 2; on TTI 20 (N_TTI=20), Pattern_ID=(1+20) mod 20=1 as calculated, and thus on TTI 20, any cell transmits the RS according to RS pattern index 1;

Way 2: Pattern_ID=(Cell_ID+N_TTI) mod N_cell; wherein, Pattern_ID represents the ID of the RS predetermined transmission time and the RS predetermined frequency used for transmitting the RS, Cell_ID represents the ID of the cell transmitting the RS, N_TTI represents the number of the TTI on which the RS is transmitted, or the cycle number for transmitting the RS, mod represents modulus operation, N_cell represents the number of cells transmitting the RS, which is preset on both the cell side and the UE side, for example, N_TTI=2, so that no signaling is needed; or each cell may send signaling to the UE to notify this value, so that this value can be configured in a more flexible manner.

For example, the ID of any cell is 1, N_cell=2, on TTI 1 (N_TTI=1), Pattern_ID=(1+1) mod 2=0 as calculated, and thus on TTI 1, any cell transmits the RS according to RS pattern index 0;

Way 3: Pattern_ID=(Cell_ID+N_TTI+c(N_TTI)) mod N_cell; wherein, Pattern_ID represents the ID of the RS predetermined transmission time and the RS predetermined frequency used for transmitting the RS, Cell_ID represents the ID of the cell transmitting the RS, N_TTI represents the number of the TTI on which the RS is transmitted, or the cycle number for transmitting the RS, mod represents modulus operation, N_cell represents the number of cells transmitting the RS, c(N_TTI) represents a random sequence, which is different for different N_TTI, and which may be preset on both the cell side and the UE side;

For example, the ID of any cell is 1, when N_TTI is 1, 2, 3, the value of c(N_TTI) is 4, 16, 21, respectively; N_cell=2; on TTI 1 (N_TTI=1), Pattern_ID=(1+1+4) mod 2=0 as calculated, and thus on TTI 1, any cell transmits the RS according to RS pattern index 0;

Way 4: Pattern_ID=(Cell_ID+ë⌊N_TTI/(K×P_FB)⌋)mod N_cell; wherein, Pattern_ID represents the ID of the RS predetermined transmission time and the RS predetermined frequency used for transmitting the RS, Cell_ID represents the ID of the cell transmitting the RS, N_TTI represents the number of the TTI on which the RS is transmitted, or the cycle number for transmitting the RS, P_FB represents the cycle of CSI feedback of the UE; K represents a natural number, ⌊x⌋ represents flooring operation of x, mod represents modulus operation, N_cell represents the number of cells transmitting the RS, for example, N_cell may represent the total number of cells transmitting the RS to the UE according to the RS pattern;

Note that, since ⌊N_TTI/(K×P_FB)⌋ increases by 1 every K×P_FB TTIs, representing that the RS pattern index changes once upon the UE feeds back the RS measured K times. This has an advantage of allowing the UE to feed back only after measuring the RS transmitted from a cell several times, so that UE measurement accuracy can be improved.

Way 5: Pattern_ID=(Cell_ID+ë⌊N_TTI/K×N_rank⌋)mod N_cell; wherein, Pattern_ID represents the ID of the RS predetermined transmission time and the RS predetermined frequency used for transmitting the RS, Cell_ID represents the ID of the cell transmitting the RS, N_TTI represents the number of the TTI on which the RS is transmitted; K represents a natural number, N_rank represents the number of cycles of transmitting the RS required by the UE to feed back one rank indicator RI, ⌊x⌋ represents flooring operation of x, N_cell represents the number of cells transmitting the RS, for example, N_cell may represent the total number of cells transmitting the RS to the UE according to the RS pattern;

Note that, in present communication systems, UE is often required to feed back several kinds of CSI, including CQI (Channel Quality Indicator), PMI (Precoding Matrix Indicator), and RI (Rank Indicator), wherein, Modulation and Coding Scheme (MCS) recommended by UE is carried on CQI, and wherein PMI and RI characterize spatial dimensional CSI, and in general RI has the longest feedback cycle, thus the cell may acquire complete CSI only after RI has been fed back by the UE one time;

Since ⌊N_TTI/K×N_rank⌋ increases by 1 every K×N_rank time, representing that the RS pattern index changes once upon the UE feeds back RI K times. This has an advantage of allowing the UE to feed back several times after measuring the RS transmitted from a cell, facilitating the cell in UE scheduling.

Step 506: the UE receives the RS transmitted through different RS resources, and on those different RS resources, according to the RS predetermined transmission time and the RS predetermined frequency, obtains CSI between the at least two cells and the UE sequentially;

After receiving the RS, the UE measures the RS on each resource according to the RS predetermined transmission times, the RS predetermined frequencies, and the RS sequence information, so that CSI between the cells and the UE can be obtained, in the prior art, the UE needs to measure the RS transmitted from each cell, which may increase UE complexity, in the solution provided in this invention however, the UE only needs to measure the RS transmitted according to the RS predetermined transmission time and the RS predetermined frequency, that is, only one RS is required to be measured, so that UE complexity can be reduced.

Note that, as to a UE requiring to know CSI corresponding to multiple cells, it is possible to configure the UE according to the previous method to measure the RS transmitted by cell 1 or cell 2 at a cycle of 5 TTIs, that is, the RS transmitted from a cell is measured on TTIs 0, 5, 15, . . . , in other words, the RS measured by the UE on TTIs 0, 10, 20, (first resource) is transmitted from cell 1, and the RS measured by the UE on TTIs 5, 15, 25, (second resource) is transmitted from cell 2. Because a cell responsible for scheduling may be aware of CSI corresponding to cell 1 and cell 2 through for example a wired connection, CoMP schedule can be performed for the UE.

As to a UE not requiring to know CSI corresponding to multiple cells, the UE can be configured to measure at a cycle of 10 TTIs, i.e., to measure the RS transmitted from a cell at TTIs 0, 10, 20, . . . , all of the RS received by the UE on these TTIs is transmitted from cell 1, and better measurement accuracy can be obtained through filtering, i.e., through setting non-zero k.

Herein, a first UE requiring to know CSI corresponding to multiple cells receives the RS transmitted by a cell every 5 TTIs while a second UE not requiring to know CSI corresponding to multiple cells only measures the RS transmitted from a cell every 10 TTIs, that is, the RS measured by the second UE is only a subset of the RS transmitted by the cell.

In this manner, for a system having compatibility considered, this is very useful. For example, it is desired to keep compatibility among several wireless communication system versions of 3GPP (3rd generation partnership project), for example, it is expected for Release 11 (R11) to be compatible with Release 10 (R10). In this situation, a R10 supported UE is a UE not requiring to know CSI corresponding to multiple cells, because when a R11 system sends it signals for scheduling multiple cell coordination, it cannot receive normally. In this scenario, with this invention, the UE of R10 may still operate normally; while the R11 supported UE may be considered as a UE requiring to know CSI corresponding to multiple cells, and this invention is utilized to enable the R11 supported UE to gain benefits of the CoMP technique.

Step 507: any one cell of the at least two cells sets a filtering coefficient to 0, and sends the UE the filtering coefficient and a filtering cycle, to enable the UE to perform filtering on the CSI between any one cell or cell group out of at least two cells and the UE obtained by the UE through measuring the RS;

Particularly, the filtering coefficient sent to the UE is set to 0, such that the result of filtering after the $n^{th}$ measurement is the measured value of the $n^{th}$ measurement.

In the prior art, in order to enable the UE to obtain higher accuracy in measurement of the RS transmitted from various cells, a coefficient FilterCoefficient is commonly used to control filtering performed by the UE on multiple measurement results, the cell sends the coefficient FilterCoefficient to the UE, and the UE, after multiple RS measurements, obtains a filtered result through calculation according to the following equation and then feeds back the value to the cell.

$F_n = (1-a) \cdot F_{n-1} + a \cdot M_n$, wherein Mn represents the value of the $n^{th}$ measurement, Fn represents the filleted result after the $n^{th}$ measurement, for the first measurement, F0 is set to M1, $a=\frac{1}{2}(k/4)$, wherein k is the filtering coefficient FilterCoefficient.

It can be seen from the above equation, if k is set to 0, a=1 and thus $F_n = M_n$, representing that the result of filtering after the $n^{th}$ measurement is just the measured value of the $n^{th}$ measurement.

For the solution provided in the embodiment of this invention, such a setting has the benefit of avoiding filtering the RS transmitted from multiple cells, which may lead to inaccurate estimation. For example, UE is configured to measure RS pattern index 1, and on TTI 1 and TTI 2, the RS measured is transmitted from cell 1 and cell 2 respectively, in this case, if the filtering coefficient is not configured to 0 for the UE, according to the above equation, the CSI fed back by the UE on TTI 2 also reflects the CSI measured on TTI 1, therefore after receiving the CSI fed back from the UE, it is not appropriate to adopt the CSI as the CSI of cell 2; if the filtering coefficient is set to 0, according to the above equation, the CSI fed back by the UE on TTI 2 only reflect CSI measured on TTI 2, that is, the CSI fed back by the UE on TTI 2 only reflect CSI of cell 2, therefore after receiving the CSI fed back from the UE, it may be adopted as the CSI of cell 2.

As to the transmission of the filtering cycle, it indicates a period of the RS measured by the UE that is used in the filtering. For example, the period of the UE to measure the RS transmitted by a cell is 5, on TTIs 0, 10, 20 (first resource), the RS transmitted by cell 1 is measured, on TTIs 5, 15, 25 (second resource), the RS transmitted by cell 2 is measured. If the filtering coefficient of the UE is configured to be 0, the feedback CSI from UE is an unfiltered measurement value, hence the feedback value has lower accuracy due to not being filtered.

Thus, in order to guarantee the accuracy of the feedback result while ensuring that the feedback result of the UE merely reflects CSI of a certain cell, a filtering cycle of 10 may be transmitted to the UE, and therefore the UE only measures and performs filtering on TTIs at an interval of 10. For example, the UE measures multiple values on TTIs 0, 10, 20 (first resource) and applies equation $F_n = (1-a) \cdot F_{n-1} + a \cdot M_n$ on these values, for example, the feedback result on TTI 10 is Fn−1, the measured value on TTI 20 is Mn, the feedback result is $F_n = (1-a) \cdot F_{n-1} + a \cdot M_n$. Because the RS measurement values for filtering are all obtained through measuring the RS transmitted from cell 1, the filtered result reflects CSI between cell 1 and the UE. The same is also true for cell 2.

Step 508: the UE receives the filtering coefficient and the filtering cycle transmitted by any one cell of the at least two cells, and performs filtering on CSI between any one cell or cell group out of at least two cells and the UE obtained after measuring the RS;

Note that the execution order of steps 505-508 is not strictly unchanged, after the completion of step 505, step 507 may be executed, followed by steps 506 and 508, or steps 505 and 507 may be executed simultaneously, steps 506 and 508 may be executed simultaneously.

Step 509: the UE transmits the measurement result to any one cell of the at least two cells, the measurement result comprising CSI between any one cell or cell group out of the at least two cells and the UE.

Note that, in the prior art, the UE needs to measure a RS transmitted by each cell and then feedback obtained CSI between each cell and the UE to the cell, leading to larger feedback overhead, in addition, as to UE in the prior art, because it is unable to feed back the measurement result of CSI corresponding to multiple cells, the cell responsible for scheduling cannot obtain CSI between each cell and the UE, making the coordination among various cells unachievable. According to the solution provided in the embodiment of this invention, the UE only needs to feed back CSI corresponding to one RS, as a result, feedback overhead is reduced, so that the cell responsible for scheduling can obtain CSI between multiple cells and the UE from the feedback of UE which is unable to feed back CSI between multiple cells and the UE, facilitating the realization of sensible coordination.

Step 511, any one cell of the at least two cells receives the measurement result transmitted by the UE, the measurement result comprising CSI between any one cell or cell group out of at least two cells and the UE.

Note that, the executive body of receiving the measurement result transmitted by the UE may be a serving cell of the UE or a cell in a coordinated set of the UE.

Note that, when the cell responsible for scheduling knows CSI between individual cell and the UE, it may flexibly select an appropriate cell to transmit signal to the UE, so that transmission efficiency is improved, for example, a cell corresponding to CSI with the highest transmission efficiency is selected to serve the UE.

When the cell responsible for scheduling knows CSI between the cell group and the UE, the cell may achieve flexible scheduling according to the CSI, for example, when the combined CSI between cell 1, cell 2 and the UE may realize higher transmission efficiency, cell 1 and cell 2 may be scheduled simultaneously to serve the UE.

According to the method for obtaining channel state information provided in the embodiment of this invention, through receiving a RS predetermined transmission time and a RS predetermined frequency transmitted from any one cell of at least two cells, and then receiving the RS transmitted through different RS resources by any one cell or cell group out of at least two cells, and on the different RS resources, measuring the RS according to the RS predetermined transmission time and the RS predetermined frequency, CSI between the at least two cells or cell group and the UE is obtained, and the measurement result is transmitted to any one cell of the at least two cells, as compared to the larger signaling and feedback overheads and increased UE operation complexity in the acquisition of CSI between multiple cells and the UE in the prior art, through transmitting information of one RS to the UE, the solution provided in the embodiment of this invention enables the UE to measure only one RS and feed back CSI corresponding to the RS, so that signaling and feedback overheads may be reduced, and UE operation complexity may be lowered.

An apparatus for obtaining channel state information is provided in an embodiment of this invention, wherein the apparatus is used to implement the method of FIG. 5 on the side of any one cell of at least two cells, and is embodied in any one cell of at least two cells serving a UE, particularly, it may be a BS or a transceiver node in the cell. As shown in FIG. 9, the apparatus comprises: a transmission unit 901, an execution unit 902, a computing unit 903, a reference signal transmission unit 904, a setting unit 905, a filtering signal transmission unit 906, and a receiving unit 907.

The transmission unit 901 is used to transmit a RS predetermined time and a RS predetermined frequency to the UE;

Time-frequency may be also called as a grid of time-frequency. RS resources may take TTI (Transmission Time Interval) as a unit in time and PRB (Physical Resource Block) as a unit in frequency. One TTI has a length of 1 ms, comprising 14 symbols; a PRB represents 12 subcarriers within a TTI, wherein each subcarrier on each symbol is called as a RE (Resource Element), that is, a PRB comprises (12*14) REs. Each RE corresponds to a time with symbol as unit and a frequency with subcarrier as unit. Particularly, a RE transmission time, a RE number, and a RE format are sent to the UE. The RE format is represented as (K,L), wherein K represents PRB having a value of 0, 1, . . . , 11; L represents TTI having a value of 0, 1, . . . , 13. Herein, the RS predetermined transmission time and the RS predetermined frequency may be also called as RS pattern information.

The execution unit 902 is used to obtain identical RS sequence information and send it to the UE, wherein the RS sequence information is used to generate the RS;

Particularly, the RS sent by each of the at least two cells is generated from a sequence, for example, in a LTE-Advanced system, the generation function of the CSI-RS sequence is:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

Wherein, c(•) represents a random sequence, with characteristics dependent on the cell ID and the TTI number; m represents a PRB number, $N_{RB}^{max,DL}$ represents the maximum number of DL (Downlink) PRBs. Upon generating a sequence of r(m) in a length $N_{RB}^{max,DL}$ according to the above equation, the cell maps the sequence to REs used for CSI-RS transmission and sends them to the UE along with other signals.

Note that the term "identical" as used in "the identical RS sequence information" means, when sending RS to the UE, the transition time and transmission frequency are identical to the RS predetermined transmission time and the RS predetermined frequency.

The execution unit 902 is particularly used to obtain the identical RS sequence information from a serving cell of the UE, wherein a cell sending signaling to the UE through a PDCCH (Physical Downlink Control Channel) is the serving cell; or the identical RS sequence information is obtained through an interface between the at least two cells; or the identical RS sequence information is determined by the at least two cells respectively.

In a CoMP (Coordinated Multiple Point transmission/reception) system, a cell sending signaling to the UE through a PDCCH (Physical Downlink Control Channel) is called as the serving cell of the UE, which is generally a cell to which the UE is accessed and has the best channel communication state; other cells transmitting data to the UE are called as coordinated cells; the serving cell and the coordinated cells constitute a coordinated collection.

Note that for the convenient of transmitting to the UE the RS according to the RS predetermined transmission time and the RS predetermined frequency, or not transmitting the RS according to the RS predetermined transmission time and the RS predetermined frequency, the RS predetermined transmission time and the RS predetermined frequency may be numbered.

The computing unit 903 is used to compute the number of the RS predetermined transmission time and the RS predetermined frequency according to the total number of all RS predetermined transmission times and RS predetermined frequencies, a RS resource number, a cell ID, the total number of cells transmitting the RS to the UE, and some or all references of a random sequence;

Particularly, the computing unit 903 is used to compute the number of the RS predetermined transmission time and the RS predetermined frequency according to Pattern_ID=(Cell_ID+N_TTI)mod M; or Pattern_ID=(Cell_ID+N_TTI) mod N_cell; or Pattern_ID=(Cell_ID+N_TTI+c(N_TTI)) mod N_cell; or Pattern_ID=(Cell_ID+ë$\lfloor$N_TTI/(K×P_FB)$\rfloor$)mod N_cell; or Pattern_ID=(Cell_ID+ë$\lfloor$N_TTI/K× N_rank$\rfloor$)mod N_cell; Wherein, Pattern_ID represents the number of the RS predetermined transmission time and the RS predetermined frequency used for transmitting the RS; Cell_ID represents the ID of the cell transmitting the RS; N_TTI represents the number of the TTI on which the RS is transmitted, or the cycle number for transmitting the RS; mod represents modulus operation; the value of M is set on both the side of various cells and the side of the UE; N_cell represents the number of cells transmitting the RS, which is preset on both the cell side and the UE side, so that no signaling is needed, or each cell may send signaling to the UE to notify this value, so that this value can be configured in a more flexible manner; c(N_TTI) represents a random sequence, which may be preset on both the cell side and the UE side; P_FB represents the cycle of CSI feedback of the UE; K represents a natural number, $\lfloor x \rfloor$ represents flooring operation of x; N_rank represents the number of cycles of transmitting the RS required by the UE to feed back one rank indicator RI.

The reference signal transmission unit 904 is used to, according to the RS predetermined transmission time and the RS predetermined frequency, transmit a RS to the UE through RS resources, to enable the UE to sequentially measure the RS received on the different RS resources according to the RS predetermined transmission time and the RS predetermined frequency; wherein RS resources used by the at least two cells serving the UE when transmitting the RS to the UE according to the RS predetermined transmission time and the RS predetermined frequency are different RS resources;

Note that, when any one cell of the at least two cells transmits the RS to the UE, the reference signal transmission unit is further used to: on the RS resource on which a first cell transmits the RS to the UE according to the RS predetermined transmission time and the RS predetermined frequency, do not transmit RS to the UE according to the RS predetermined transmission time and the RS predetermined frequency, wherein the apparatus the reference signal transmission unit is located in belongs to a cell different to the first cell, and the first cell is any one cell of the at least two cells;

Wherein the reference signal transmission unit is further used to: on the RS resource on which the first cell transmits the RS to the UE according to the RS predetermined transmission time and the RS predetermined frequency, do not transmit signal at the RS predetermined transmission time and the RS predetermined frequency.

Note that, reference signal transmission units of different cells may transmit the RS to the UE on the RS resources simultaneously.

The setting unit 905 is used to set a filtering coefficient to zero;

Herein, the filtering coefficient is set to 0, such that the filtered result upon the $n^{th}$ measurement is the measurement value of the $n^{th}$ measurement. A filtering cycle is transmitted to indicate a period of the RS measured by the UE that is used in the filtering.

The filtering signal transmission unit 906 is used to transmit the filtering coefficient and the filtering cycle to the UE, to enable the UE to perform filtering on the CSI between any one cell or cell group out of at least two cells and the UE obtained by the UE through measuring the RS.

The receiving unit 907 is used to receive the measurement result transmitted by the UE, the measurement result comprising CSI between any one cell or cell group out of at least two cells and the UE.

The CSI between any one cell or cell group out of at least two cells and the UE is the result of the filtering after the RS is measured by the UE.

According to the apparatus for obtaining channel state information provided in the embodiment of this invention, a RS predetermined transmission time and a RS predetermined frequency are transmitted to the UE by the transmission unit; the reference signal transmission unit, according to the RS predetermined transmission time and the RS predetermined frequency, transmits a RS to the UE on different RS resources; the receiving unit receives the measurement result transmitted by the UE, which comprises CSI between any one cell or cell group out of at least two cells and the UE. As compared to the larger signaling and feedback overheads and increased UE operation complexity in the acquisition of CSI between multiple cells and the UE in the prior art, through transmitting information of one RS to the UE, the solution provided in the embodiment of this invention enables the UE to measure only one RS and feed back CSI corresponding to the RS, so that signaling and feedback overheads may be reduced, and UE operation complexity may be lowered.

Figure 10:
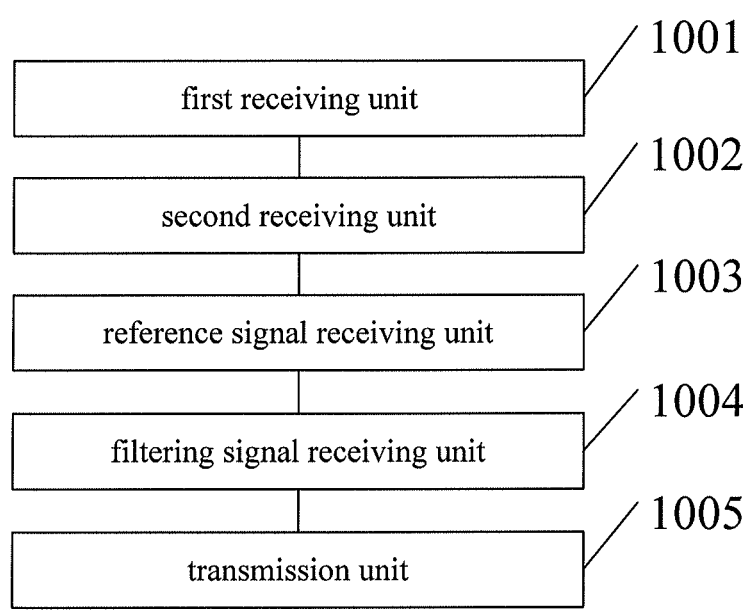
FIG. 10 is a block diagram of another apparatus for obtaining channel state information provided in embodiment 1 of this invention.

An apparatus for obtaining channel state information is provided in an embodiment of this invention, which is used to implement the method of FIG. 5 on the UE side. The apparatus is a UE. As shown in FIG. 10, the apparatus comprises: a first receiving unit 1001, a second receiving unit 1002, a reference signal receiving unit 1003, and a filtering signal receiving unit 1004, and a transmission unit 1005.

The first receiving unit 1001 is used to receive a RS predetermined time and a RS predetermined frequency transmitted by any one cell of at least two cells;

The second receiving unit 1002 is used to receive identical RS sequence information transmitted from the any one cell or cell group out of at least two cells, wherein the identical RS sequence information is used to generate the RS;

Note that, the RS sequence information is used to measure a received RS at the UE. In this way, using a RS sequence corresponding to the RS sequence information, any one cell of the at least two cells generates a RS, which passes through a wireless channel during the transmission to the UE; after received by the UE, it performs convolution or the like on the received signal that has passed through the wireless channel by using the RS sequence corresponding to the identical RS sequence information, to recognize CSI of the wireless channel.

The reference signal receiving unit 1003 is used to receive a RS transmitted on different RS resources, and on the different RS resources, sequentially measure the RS according to the RS predetermined time and the RS predetermined frequency, to obtain CSI between the at least two cells and the UE;

After receiving the RS, the UE measures the RS on each resource according to the RS predetermined transmission times, the RS predetermined frequencies, and the RS sequence information, so that CSI between the cells and the UE can be obtained, in the prior art, the UE needs to measure the RS transmitted from each cell, which may increase UE complexity, in the solution provided in this invention however, the UE only needs to measure the RS transmitted according to the RS predetermined transmission time and the RS predetermined frequency, that is, only one RS is required to be measured, so that UE complexity can be reduced.

The filtering signal receiving unit 1004 is used to receive the filtering coefficient and the filtering cycle transmitted by any one cell of the at least two cells and perform filtering on the CSI between any one cell or cell group out of at least two cells and the UE obtained through measuring the RS;

Herein, the filtering coefficient is set to 0. Filtering is performed on the measured RS according to the received preset filtering coefficient and the filtering cycle. The filtered result after the $n^{th}$ measurement is the measurement value of the $n^{th}$ measurement.

The transmission unit 1005 is used to transmit the measurement result to any one cell of the at least two cells, the measurement result comprising CSI between any one cell or cell group out of at least two cells and the UE According to the apparatus for obtaining channel state information provided in the embodiment of this invention, a RS predetermined transmission time and a RS predetermined frequency transmitted from any one cell of at least two cells are received by the first receiving unit, and then the reference signal receiving unit receives the RS transmitted on different RS resources, and on the different RS resources, measures the RS according to the RS predetermined transmission time and the RS predetermined frequency, to obtain CSI between the at least two cells and the UE; the transmission unit is used to transmit the measurement result to any one cell of the at least two cells. As compared to the larger signaling and feedback overheads and increased UE operation complexity in the acquisition of CSI between multiple cells and the UE in the prior art, through transmitting information of one RS to the UE, the solution provided in the embodiment of this invention enables the UE to measure only one RS and feed back CSI corresponding to the RS, so that signaling and feedback overheads may be reduced, and UE operation complexity may be lowered.

What are described above are merely specific embodiments of the present invention, but do not limit the protection scope of the present invention. Modifications or replacements that are easily figured out by persons skilled in the art within the technical scope of the present invention shall fall within the protection scope of the present invention. Therefore, the protection scope of the present invention is subject to the appended claims.

What is claimed is:

1. A method for obtaining channel state information, comprising:
   transmitting, from any one cell of at least two cells, a RS predetermined time and a RS predetermined frequency to a UE;
   according to the RS predetermined transmission time and the RS predetermined frequency, transmitting a RS to the UE through different RS resources by each cell or cell group out of the at least two cells, to enable the UE to measure the RS received on the different RS resources sequentially according to the RS predetermined transmission time and the RS predetermined frequency;
   receiving the measurement result transmitted by the UE, the measurement result comprising channel state information CSI between any one cell or cell group out of at least two cells and the UE,
   wherein a number of the RS predetermined transmission time and the RS predetermined frequency is computed according to a total number of all RS predetermined transmission times and RS predetermined frequencies, a RS resource number, a cell ID, a total number of cells transmitting the RS to the UE, and some or all references of a random sequence.

2. The method for obtaining channel state information according to claim 1, wherein, before transmitting a RS to the UE through different RS resources by each cell or cell group out of the at least two cells according to the RS predetermined transmission time and the RS predetermined frequency, further comprising:
   obtaining identical RS sequence information and sending it to the UE, wherein the RS sequence information is used to generate the RS.

3. The method for obtaining channel state information according to claim 2, wherein obtaining identical RS sequence information comprises:
   obtaining the identical RS sequence information from a serving cell of the UE, wherein a cell sending signaling to the UE through a Physical Downlink Control Channel PDCCH is the serving cell; or
   obtaining the identical RS sequence information through an interface between the at least two cells; or
   determining the identical RS sequence information by the at least two cells respectively.

4. The method for obtaining channel state information according to claim 1, wherein when each cell of the at least two cells transmits a RS to the UE on different RS resources according to the RS predetermined transmission time and the RS predetermined frequency, on the RS resource on which a first cell transmits the RS to the UE according to the RS predetermined transmission time and the RS predetermined frequency, other cells except for the first cell of the at least two cells do not transmit the RS to the UE according to the RS predetermined transmission time and the RS predetermined frequency, wherein the first cell is any one cell of the at least two cells.

5. The method for obtaining channel state information according to claim 4, wherein not transmitting the RS to the UE according to the RS predetermined transmission time and the RS predetermined frequency comprises: other cells except for the first cell of the at least two cells do not transmit signal at the RS predetermined transmission time and the RS predetermined frequency.

6. The method for obtaining channel state information according to claim 1, wherein the number of the RS predetermined transmission time and the RS predetermined frequency is computed according to Pattern_ID=(Cell_ID+ N_TTI)mod M; or Pattern_ID=(Cell_ID+N_TTI)mod N_cell; or Pattern_ID=(Cell_ID+N_TTI+c(N_TTI)) mod N_cell; or Pattern_ID=(Cell_ID+ë⌊N_TTI/(K×P_FB)⌋)mod N_cell; or Pattern_ID=(Cell_ID+ë⌊N_TTI/K×N_rank⌋)mod N_cell;
   wherein, Pattern_ID represents the number of the RS predetermined transmission time and the RS predetermined frequency used for transmitting the RS; Cell_ID represents the ID of the cell transmitting the RS; N_TTI represents the number of the TTI on which the RS is transmitted; mod represents modulus operation; M represents a number of RS patterns formed from all RS predetermined transmission times and RS predetermined frequencies; N_cell represents the number of cells transmitting the RS; c(N_TTI) represents a random sequence; P_FB represents the cycle of CSI feedback of the UE; K represents a natural number, $\lfloor x \rfloor$ represents flooring operation of x; N_rank represents the number of cycles of transmitting the RS required by the UE to feed back one rank indicator RI.

7. The method for obtaining channel state information according to claim 1, wherein, after transmitting a RS to the UE through different RS resources by each cell or cell group out of the at least two cells according to the RS predetermined transmission time and the RS predetermined frequency, further comprising:
setting a filtering coefficient to 0;
transmitting the filtering coefficient and the filtering cycle to the UE, to enable the UE to perform filtering on the CSI between any one cell or cell group out of at least two cells and the UE obtained by the UE through measuring the RS.

8. A method for obtaining channel state information, comprising:
receiving a RS predetermined transmission time and a RS predetermined frequency transmitted by any one cell of at least two cells;
receiving a RS transmitted on different RS resources, and on the different RS resources, sequentially measuring the RS according to the RS predetermined time and the RS predetermined frequency, to obtain CSI between the at least two cells and the UE;
transmitting the measurement result to the any one cell of the at least two cells, the measurement result comprising CSI between any one cell or cell group out of at least two cells and the UE; and
receiving a filtering coefficient and a filtering cycle transmitted by any one cell of the at least two cells and performing filtering on the CSI between any one cell or cell group out of at least two cells and the UE obtained through measuring the RS, wherein the filtering coefficient is 0.

9. The method for obtaining channel state information according to claim 8, wherein, before receiving a RS transmitted by any one cell or cell group out of at least two cells on different RS resources, further comprising:
receiving identical RS sequence information transmitted from the any one cell or cell group out of at least two cells, wherein the identical RS sequence information is used to generate the RS.

10. An apparatus for obtaining channel state information, wherein a UE is served by at least two cells, the apparatus for obtaining channel state information is an apparatus in any one cell of the at least two cells, the apparatus comprising:
transmitter configure to transmit a RS predetermined time and a RS predetermined frequency to the UE;
a processor configured to enable the transmitter to transmit a RS to the UE on RS resources according to the RS predetermined transmission time and the RS predetermined frequency, to enable the UE to measure the RS received on the different RS resources sequentially according to the RS predetermined transmission time and the RS predetermined frequency, wherein the RS resources used by the at least two cells serving the UE when transmitting the RS to the UE according to the RS predetermined transmission time and the RS predetermined frequency are different RS resources;
receiver configured to receive the measurement result transmitted by the UE, the measurement result comprising CSI between any one cell or cell group out of at least two cells and the UE, wherein the processor is further configured to compute a number of the RS predetermined transmission time and the RS predetermined frequency according to the total number of all RS predetermined transmission times and RS predetermined frequencies, a RS resource number, a cell ID, the total number of cells transmitting the RS to the UE, and some or all references of a random sequence.

11. The apparatus for obtaining channel state information according to claim 10, wherein the processor is further configured to obtain identical RS sequence information and sending it to the UE, wherein the RS sequence information is used to generate the RS.

12. The apparatus for obtaining channel state information according to claim 11, wherein the processor is further configured to:
obtain the identical RS sequence information from a serving cell of the UE, wherein the serving cell is a cell sending signaling to the UE through a Physical Downlink Control Channel PDCCH; or
obtain the identical RS sequence information through an interface between the at least two cells; or
determine the identical RS sequence information by the at least two cells respectively.

13. The apparatus for obtaining channel state information according to claim 10, wherein the processor is further configured to enable the transmitter, on the RS resource on which a first cell transmits the RS to the UE according to the RS predetermined transmission time and the RS predetermined frequency, transmit no RS to the UE according to the RS predetermined transmission time and the RS predetermined frequency, wherein the apparatus belongs to a cell different to the first cell, and the first cell is any one cell of the at least two cells.

14. The apparatus for obtaining channel state information according to claim 10, wherein the processor is further configured to enable the transmitter, on the RS resource on which a first cell transmits the RS to the UE according to the RS predetermined transmission time and the RS predetermined frequency, transmit no signal at the RS predetermined transmission time and the RS predetermined frequency.

15. The apparatus for obtaining channel state information according to claim 10, wherein the processor is further configured to compute the number of the RS predetermined transmission time and the RS predetermined frequency according to Pattern_ID=(Cell_ID+N_TTI)mod M; or Pattern_ID=(Cell_ID+N_TTI)mod N_cell; or Pattern_ID= (Cell_ID+N_TTI+c(N_TTI))mod N_cell; or Pattern_ID= (Cell_ID+ë$\lfloor$N_TTI/(K×P_FB)$\rfloor$)mod N_cell; or Pattern_ID=(Cell_ID+ë$\lfloor$N_TTI/K×N_rank$\rfloor$)mod N_cell;
wherein, Pattern_ID represents the number of the RS predetermined transmission time and the RS predetermined frequency used for transmitting the RS; Cell_ID represents the ID of the cell transmitting the RS; N_TTI represents the number of the TTI on which the RS is transmitted; mod represents modulus operation; M represents a number of RS patterns formed from all RS predetermined transmission times and RS predetermined frequencies; N_cell represents the number of cells transmitting the RS; c(N_TTI) represents a random sequence; P_FB represents the cycle of CSI feedback of the UE; K represents a natural number, $\lfloor x \rfloor$ represents flooring operation of x; N_rank represents the number of cycles of transmitting the RS required by the UE to feed back one rank indicator RI.

16. The apparatus for obtaining channel state information according to claim 10, wherein the processor is further configured to set a filtering coefficient to 0
wherein the transmitter is further configured to transmit the filtering coefficient and the filtering cycle to the UE, to enable the UE to perform filtering on the CSI between any one cell or cell group out of at least two cells and the UE obtained by the UE through measuring the RS.

17. An apparatus for obtaining channel state information, comprising:
receiver configured to receive a RS predetermined time and a RS predetermined frequency transmitted by any one cell of at least two cells and a RS transmitted on different RS resources;
a processor configured to sequentially measure the RS according to the RS predetermined time and the RS predetermined frequency on the different RS resources, to obtain CSI between the at least two cells and the UE;
a transmitter configured to transmit the measurement result to any one cell of the at least two cells, the measurement result comprising CSI between any one cell or cell group out of at least two cells and the UE; and
wherein the receiver is further configured to receive a filtering coefficient and a filtering cycle transmitted by any one cell of the at least two cells, and
wherein the processor is further configured to perform filtering on the CSI between any one cell or cell group out of at least two cells and the UE obtained through measuring the RS, wherein the filtering coefficient is 0.

18. The apparatus for obtaining channel state information according to claim 17, wherein the receiver is further configured to receive identical RS sequence information transmitted from the any one cell or cell group out of at least two cells, wherein the identical RS sequence information is used to generate the RS.

* * * * *